(12) United States Patent
Brey et al.

(10) Patent No.: US 8,890,670 B2
(45) Date of Patent: Nov. 18, 2014

(54) SMART TRAILER

(75) Inventors: Thomas A. Brey, Lake In The Hills, IL (US); Don Peterson, Belvidere, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 167 days.

(21) Appl. No.: 13/205,791

(22) Filed: Aug. 9, 2011

(65) Prior Publication Data

US 2013/0038436 A1 Feb. 14, 2013

(51) Int. Cl.
| | | |
|---|---|---|
| G08B 21/00 | (2006.01) | |
| B60Q 1/00 | (2006.01) | |
| B60T 8/17 | (2006.01) | |
| B60T 7/16 | (2006.01) | |
| B60C 23/00 | (2006.01) | |
| B60T 7/20 | (2006.01) | |

(52) U.S. Cl.
CPC .................. B60T 7/20 (2013.01); B60T 8/1708 (2013.01); B60T 7/16 (2013.01); B60C 23/009 (2013.01)
USPC ............ 340/431; 340/438; 340/440; 340/461

(58) Field of Classification Search
CPC ............. B60T 7/20; B60T 7/16; B60W 40/13
USPC .......... 340/431, 438, 440, 445, 453, 454, 461
See application file for complete search history.

(56) References Cited

U.S. PATENT DOCUMENTS

| | | | | |
|---|---|---|---|---|
| 6,452,487 | B1 * | 9/2002 | Krupinski | 340/440 |
| 2003/0236605 | A1 * | 12/2003 | Takahashi | 701/45 |
| 2005/0270148 | A1 | 12/2005 | Modawell et al. | |
| 2006/0261936 | A1 * | 11/2006 | Widmann et al. | 340/435 |
| 2007/0069877 | A1 * | 3/2007 | Fogelstrom | 340/442 |
| 2007/0194896 | A1 | 8/2007 | Ehrlich et al. | |
| 2008/0246335 | A1 * | 10/2008 | Spieker et al. | 303/122.08 |
| 2009/0032273 | A1 * | 2/2009 | Hahn | 172/2 |
| 2012/0209502 | A1 * | 8/2012 | Nichols et al. | 701/124 |

FOREIGN PATENT DOCUMENTS

WO 2008/124073 A1 10/2008

OTHER PUBLICATIONS

International Search Report and Written Opinion dated Jan. 2, 2013, from corresponding International Patent Application No. PCT/US2012/047210.

* cited by examiner

Primary Examiner — Travis Hunnings
Assistant Examiner — Omeed Alizada

(57) ABSTRACT

A trailer is provided with various parametric sensors. Trailer operating characteristics obtained from the sensors are conveyed to an attached tow vehicle. The tow vehicle is configured to respond to trailer operating conditions or characteristics and/or warn the tow vehicle operator of trailer conditions. The tow vehicle's operation can also be changed responsive to an attached trailer.

9 Claims, 4 Drawing Sheets

SMART TRAILER

BACKGROUND

A trailer is a non-motorized or unpowered vehicle designed to be hauled or pulled over a road or other surface by a motor-powered vehicle such as an automobile or a truck. Trailers are used to transport an almost countless number of different things. For that reason, there are a large number of different types and sizes of trailers that can be attached to towing vehicles that can include automobiles and all sizes and kinds of trucks.

Trailering, i.e., transporting something by means of a trailer, requires a vehicle that is mechanically capable of pulling a trailer safely. It also requires skill. Perhaps more importantly, safely hauling something with a trailer requires knowledge of the trailer, its contents and its capabilities and knowledge of its operating characteristics.

DETAILED DESCRIPTION

Figure 1:
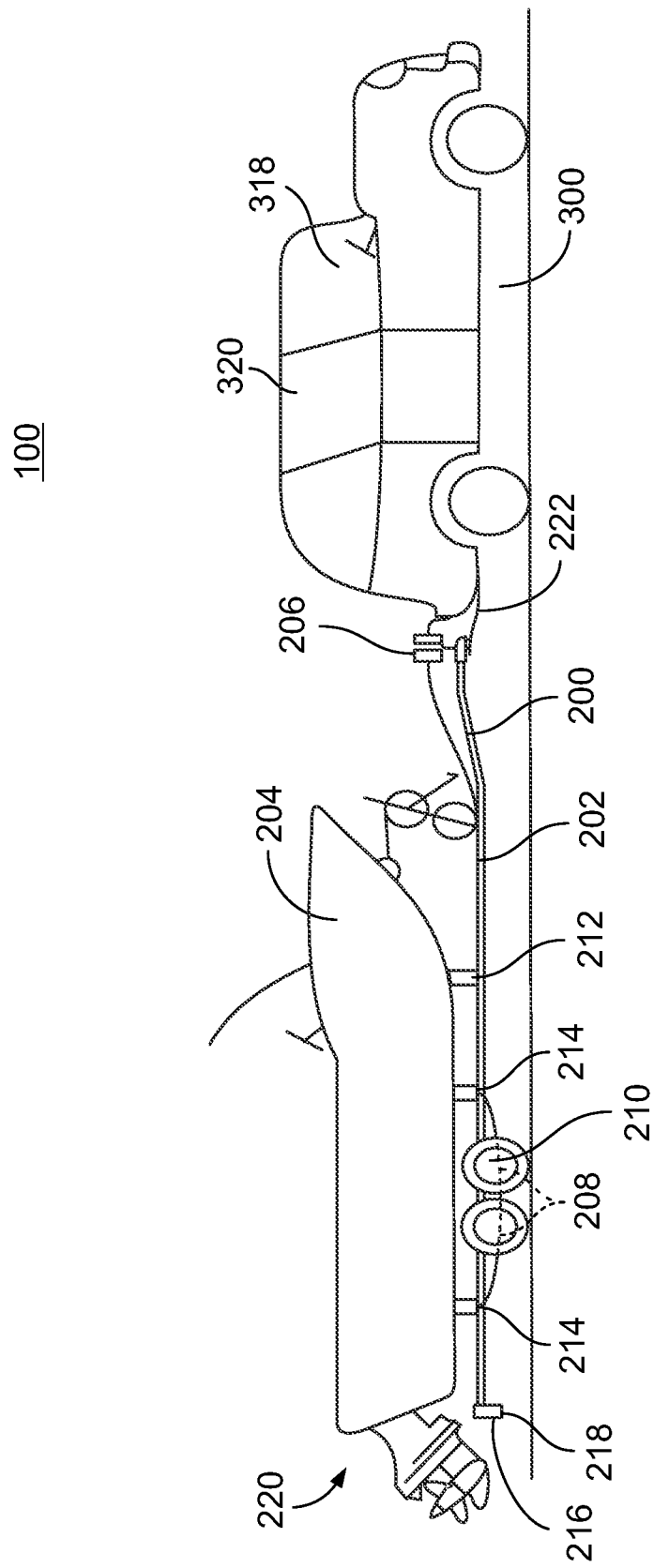
FIG. 1 is a block diagram of a smart trailering system.

FIG. 1 is a block diagram of a smart trailering system 100. The system 100 is comprised of a smart trailer 200 and a tow vehicle 300 configured to be used with a smart trailer 200.

The smart trailer 200 is comprised of a frame 202 that supports a load 204. The load 204 is depicted in FIG. 1 as boat although other trailers with other frames are able to carry other types of loads. The frame 202 is mechanically coupled to the tow vehicle 300 by a conventional trailer hitch 206 that receives a ball that is attached to the tow vehicle 300 by a conventional trailer hitch receiver.

The trailer frame 202 is attached to and rolls on wheels 208. The wheels 208 rotate on wheel bearings, not visible in the figures.

As used herein, the term sensor refers to a device that converts a physical stimulus, such as heat, light, sound, pressure, magnetism, inclination angle or a particular motion, into an electrically measurable signal. Such a signal can be either analog or digital. The smart trailer 200 is provided with various sensors that are attached to the trailer 200, its frame 202 or wheels 208 and which provide electrically-measurable signals that represent a sensed physical stimulus.

In one embodiment, the trailer 200 is equipped with temperature and operation sensors 210 for tires, wheels, wheel bearings (not shown) and wheel brakes. Such sensors generate one or more signal representatives of the wheel bearing temperature, brake temperature, brake actuation, brake wear and tire pressure.

The trailer 200 can also be equipped with an accelerometer 212 configured to detect whether the trailer frame 202 is level from front to back or side to side. Load cells 214 on the front, back and both sides of the trailer 200 (one side shown in FIG. 1) detect whether the load 204 on the trailer 200 is properly located on the trailer 200 front to back as well as side to side. Light sensors 216 detect whether the trailer's indicator lights are operational. An adjacent vehicle detector 218 mounted at the rear 220 of the trailer 200 senses distance from the rear 220 of the trailer to another vehicle behind it as well as a vehicle alongside the trailer 200. Regardless of the number and/or type of sensors used, they are responsive to physical stimuli and generate signals that represent operating parameters of the smart trailer 200.

Figure 2:
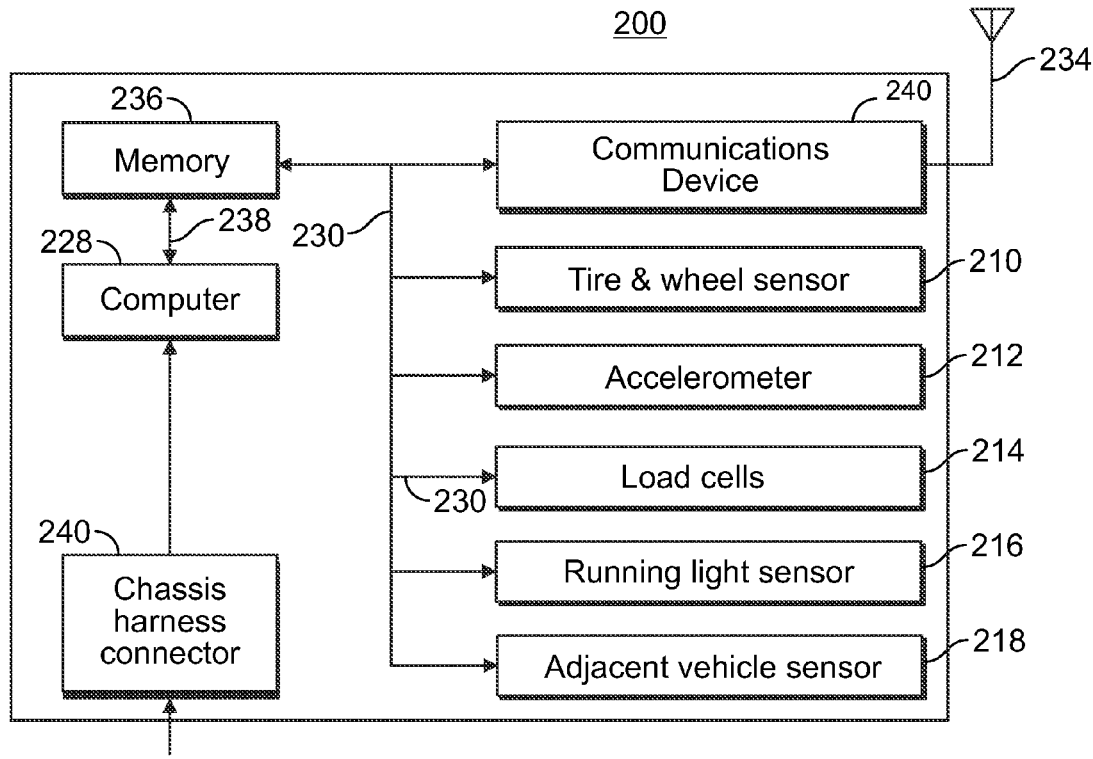
FIG. 2 is a block diagram of components that comprise a smart trailer.

The tow vehicle 300 is equipped with a conventional trailer hitch 222 and a conventional wiring harness 224 that provides power to the trailer 200 and trailer-located electronic components, which include the aforementioned sensors and electronic devices shown in FIG. 2.

FIG. 2 is a block diagram of the smart trailer 200. The various sensors 210, 212, 214, 216 and 218 described above are operatively coupled to a programmable computer 228 via a bus 230 that runs along the frame 202. The sensors are configured to detect various trailer operating parameters. Such "operating parameters" include but are not limited to conditions of brakes that the trailer might be equipped with, including brake wear and temperature. Other sensors that can be embodied as load cells detect and measure a total weight of a load on the trailer 200 as well as the distribution of the total load or weight on the trailer 200. Still other sensors can also be provided to the trailer that detect objects next to or behind the trailer, such as by way of acoustic or ultrasonic or radio frequency waves, optically or thermally.

As used herein, the term "bus" refers to a set of parallel conductors in a computer system and which forms a signal transmission path. The bus 230 that couples the sensors 210, 212, 214, 216 and 218 to the computer 228 is a multi-conductor cable that extends around the frame of the trailer 202 and is therefore external to the computer 228.

The computer 228 is operatively coupled to a two-way communications device 240 by way of the external bus 230. The communications device 240 generates signals that carry to the tow vehicle 300, analog or digital data representing information-bearing signals that are generated by the sensors. The communications device 240 also receives signals including signals that carry information that is pertinent to operation of the trailer 200. Messages that are received by the communications device are processed using conventional methods to recover information therein. Recovered information can thereafter by provided to the computer 228 and processed or stored appropriately according to program instructions in the memory device 236.

In one embodiment, the communications device 240 is a short range radio communications device such as a Blue tooth transceiver. Radio frequency signals generated by the communications device 240 are emitted from an antenna 234 attached to the trailer 200 but which is not shown in FIG. 1.

As described above and as shown in FIG. 2, the computer 228 is coupled to the sensors and the communications device 240 by the external-to-the-computer bus 230. The computer 228 is also coupled to the various sensors by the same bus 230. Those of ordinary skill in the art will also recognize that since the sensors and communications device 240 are both coupled to the bus 230 the sensors and communications device 240 are also coupled to each other. The computer 228 is thus able to effectuate control over the communications device 240 and the various sensors in part by executing program instructions stored in a memory device 236 that stores program instructions that cause the computer 228 to collect information-bearing signals from the sensors and bundle or assembly the information-bearing signals into a format that is transmitted from the communications device 240. In an alternate embodiment, however, the communications device 240 is able to obtain sensor-generated information directly from the sensors, either by directions issued from the computer 228 or by control that is exercised by the communications device 240 itself.

The memory 236 that stores the executable instructions is a non-transitory memory device that is coupled to the computer 228 via a conventional address/data/control bus 238. Examples of such device include but are not limited to static and dynamic random access memory (RAM). That same memory device also stores information about the smart trailer 200, such as its operating specifications and identifying information. Operating specifications include its external dimensions, load rating or weight-carrying capacity, its center of gravity, recommended tire pressure and maintenance history and maintenance requirements. The memory 236 can also store data pertaining to the requirements of a tow vehicle to be used with the vehicle.

In one embodiment, the instruction store memory device 236 and the computer 228 are co-resident on the same silicon die. Computer-executable program instructions in the memory are selected such that the smart trailer system depicted in FIG. 2 becomes operational and performs the method depicted in FIG. 4 as long as power is applied to the trailer 200. Power is provided to the smart trailer 200 through a conventional chassis harness connector 240 which electrically connects the trailer to the towing vehicle 300.

Figure 3:
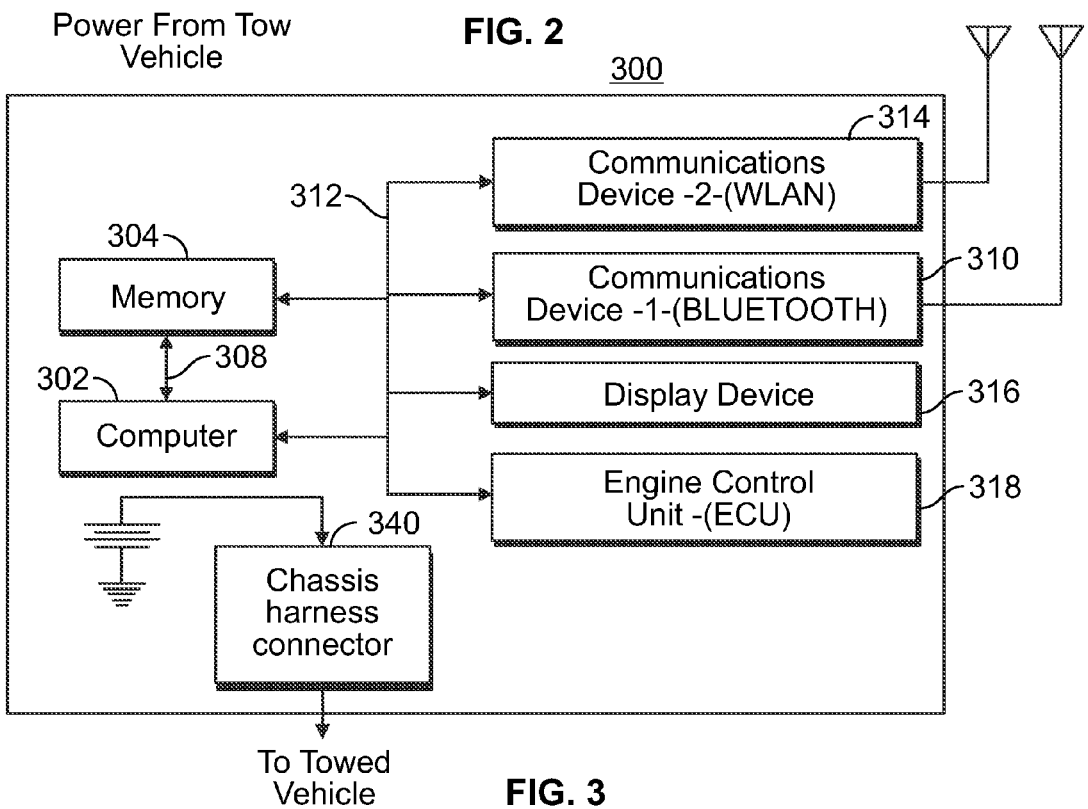
FIG. 3 is a block diagram of components that comprise a tow vehicle as part of the smart trailering system.

FIG. 3 is a block diagram of an implementation of a towing vehicle 300 for use with a smart trailer depicted in FIG. 1 and FIG. 2. A tow-vehicle-located computer 302 executes instructions stored in a memory device 304 to which the computer 302 is coupled by a conventional address/data/control bus 308. In addition to storing executable instructions, the memory device 304 also stores tow vehicle operating characteristics such as its stopping distance with and without a trailer attached, its towing capacity, as well as information received from an attached trailer 200, such as the trailer's weight with and/or without a load 204.

The computer 302 communicates with and controls a first communications device 310 via a second, separate and external-to-the-computer bus 312. The computer 302 also communicates with and controls a second communications device 314 preferably embodied as a wire area local area network or WLAN transceiver and a driver's display device 312 via the same external bus 308. Instructions executed by the computer 302 are stored in the memory device 304.

A display device 316 is coupled to the computer 302 via the external bus 312. The display device is physically located on the dash board or front portion 318 of the interior 320 of the tow vehicle 300 and configured to be viewable by at least the tow vehicle operator. Informational messages are generated by the computer 302 and displayed on the display device 316 to alert the tow vehicle operator of smart trailer 200 conditions. Warnings and alerts are also generated and displayed. In another embodiment, the display device 316 is embodied as an audio system which generates audible messages that correspond to visual messages.

The computer 302 is also connected to the tow vehicle's main control computer, which is commonly referred to as the engine control unit or ECU 318. The ECU 318 controls operation of the tow vehicle engine and transmission, among other things either by itself or in combination with other computers slaved to the ECU 318 and omitted from FIG. 3 for brevity and clarity.

Figure 4:
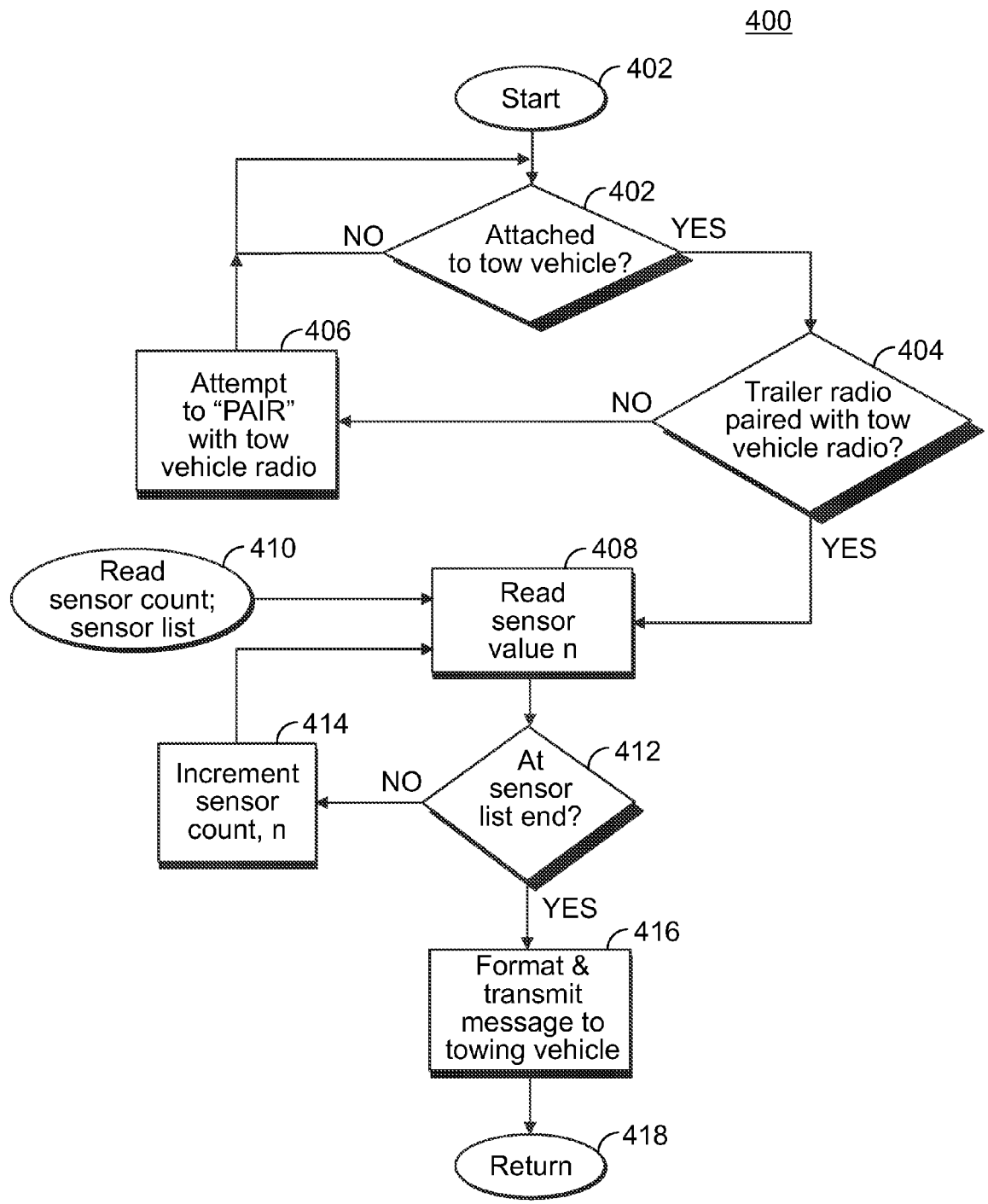
FIG. 4 is a process for use by smart trailer.

FIG. 4 depicts a method 400 of operating the smart trailer 200, including the transfer of smart trailer data from the smart trailer 200, to the tow vehicle 300. The method begins at step 402 when power is provided to the trailer 200 by the tow vehicle, i.e, when the trailer harness connector 240 is electrically connected to the mating, tow-vehicle chassis harness connector 340.

After power is provided to the smart trailer 200, at step 402, the computer 228 determines if the smart trailer 200 is mechanically attached to a tow vehicle 300, i.e., whether the trailer 200 is connected to the tow vehicle hitch. Determining the smart trailer 200 to be attached is important in order for the smart trailer 200 to know whether it should transmit sensor information to compatible vehicles it might within signal range of but which should not receive information from the trailer 200. Determining whether the smart trailer 200 is mechanically attached to the tow vehicle 300 can be determined a number of ways. One simple way to make such a determination would be to mechanically link a switch to the trailer hitch ball lock. A more elaborate method would be to use a load cell in the trailer hitch to detect force applied to it by the weight the trailer's tongue on the tow vehicle ball. Yet another way to detect whether the smart trailer 200 is attached is to "pair" a Bluetooth portable communications device or "cell phone" with a trailer-located communications device 240 embodied as a Bluetooth radio. Once the recognized trailer-located communications device 240 is recognized and paired with a driver's cell phone, data can be obtained from the trailer 200 and a determination made that it is attached to the tow vehicle.

If no tow vehicle is attached, the smart trailer method 400 stays in a loop at step 402 until the trailer 200 is mechanically attached to the tow vehicle 300.

At step 404, the computer 228 for the trailer 200 attempts to "pair" with the trailer's communications device 240, i.e., Bluetooth radio, with a compatible radio 306 on the tow vehicle 300. Bluetooth radio pairing is well known but since communications between the vehicles 200 and 300 is required in order to pass trailer sensor data from the trailer to the tow vehicle, the method depicted in FIG. 4 continues to attempt to pair the radios. If the smart trailer communications device 240 does not pair with the tow vehicle communications device 306, the smart trailer 200 continues to attempt to pair the two radios by looping from step 402 through steps 406 and 402. Once the radios are paired, the method proceeds to step 408 where the smart trailer computer 228 begins reading trailer sensors.

An important feature of the method depicted in FIG. 4 is that it allows for the number and type of sensors on the trailer 200 to be input to the smart trailer computer 228 at step 410. Such a feature enables the computer 228 to ignore or activate sensors that might not be available or useful, as happens when the trailer 200 might operated empty or under-loaded. The method thus continues to read sensors at steps 412, 414 and 408 until all of the smart trailer sensors selected by the computer 228 have been read by the computer 228. When all of the smart trailer sensors have been read, the computer 228 formats a message that is transmitted from the smart trailer communications device 240.

In one embodiment, instructions in the memory 236 cause the computer 228 to generate a message for transmission that contains information about a tow vehicle required by the trailer. In a properly configured tow vehicle 300, such a message can be used by the tow vehicle to inhibit its operation, as should happen if the tow vehicle is too small to safely pull the trailer and its load 204.

At step 418, the method repeats until power is removed from the smart trailer 200.

Figure 5:
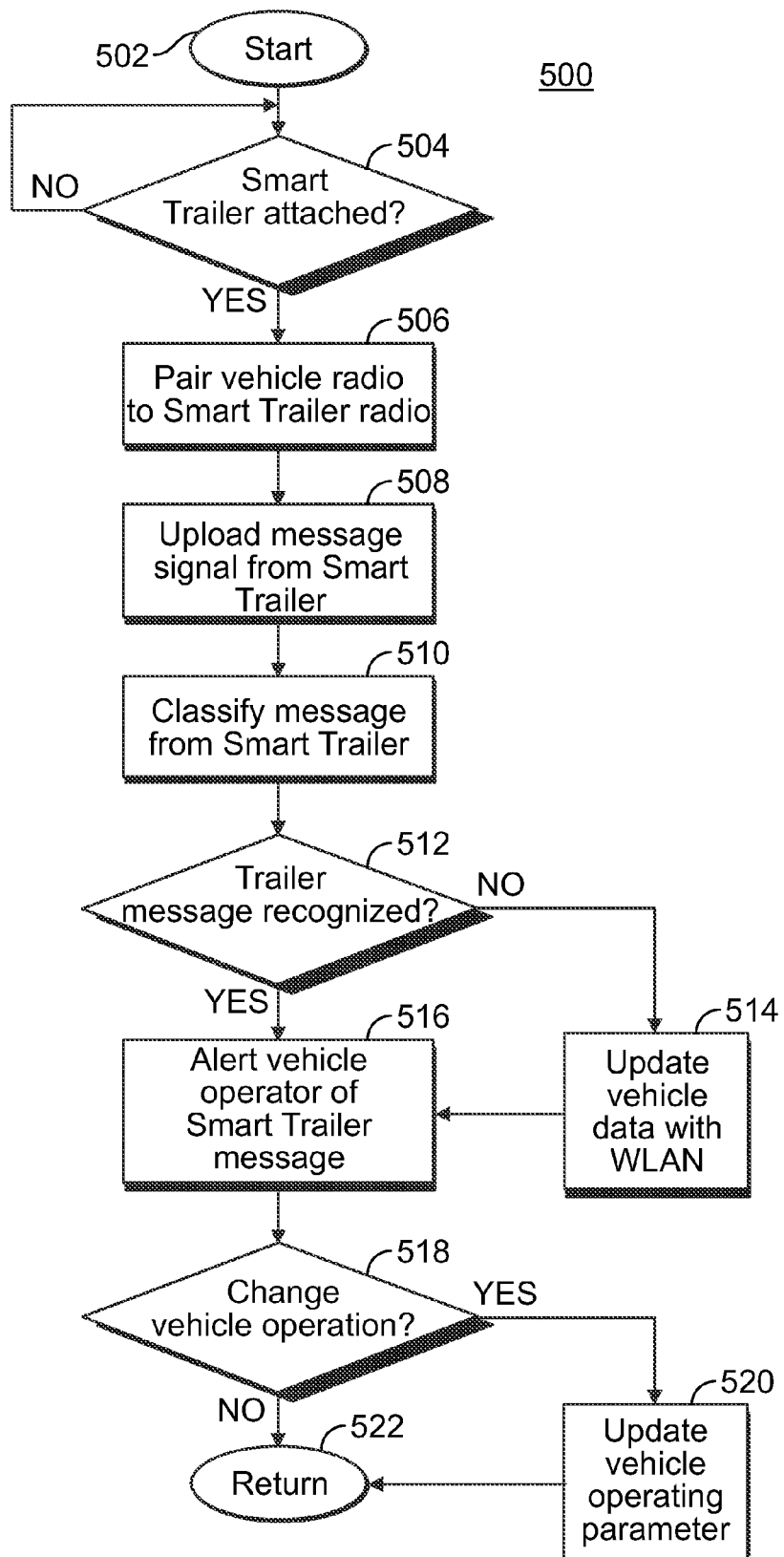
FIG. 5 is a block diagram of a smart trailering method for a tow vehicle.

FIG. 5 depicts the steps of a method 500 for trailering a smart trailer by a compatible tow vehicle 300. When power is provided to a trailer by attachment of the connectors 240 and 340 to each other, the tow vehicle method determines at step 502 whether a trailer is mechanically attached to the tow vehicle.

After the communications are paired at step 506, the first communications device in the tow vehicle uploads an available data message from the smart trailer communications device at step 508. The message received from the trailer 200 is classified at step 510 in order to determine whether the message can be recognized or parsed at step 512.

The number and variety of trailers operable with a tow vehicle makes it important for the tow vehicle to be able to update information and capabilities that might be necessary for the tow vehicle to communicate and operate with a smart trailer. At steps 512 and 514, provision is made for the tow vehicle 300 to update its vehicle data using a second communications device 310. The second communications device 310 is preferably a WLAN-compatible data communications device, i.e., compatible with the communications standards commonly known as the I.E.E.E. 8012.11(a)/(b)/(g)/(n) standards as well as derivatives thereof.

At step 516, the method decides whether data received from a smart trailer 200 warrants or requires notice to be given to an operator of the tow vehicle 300. A visible or audible alarm is provided to the tow vehicle operator when a safety-related data message is received. Examples of such a message include low tire pressure, elevated brake or wheel bearing temperature, locked brakes and/or worn brake linings. Such messages are considered herein to be trailer-related messages and can also include messages warning of an activated anti-lock braking system or a de-activated anti-lock braking system and the engagement of a vehicle stability control system.

At step 518, a decision is made whether to change or adjust tow vehicle operation responsive to the information received from the smart trailer 200. An example of a changed vehicle operation includes but is not limited to down-shifting the transmission responsive to smart trailer weight. Disabling vehicle stability control in response to a trailer sway or side-to-side acceleration is another example of changing vehicle operation. Vehicle operating parameters are updated at step 520. At step 522, program control returns to step 502

The smart trailer, tow vehicle and related methodologies enable a tow vehicle operator to operate a tow vehicle with an attached trailer more safely. The foregoing description if for purposes of illustration. The true scope of the disclosure is set forth in the appurtenant claims.

What is claimed is:

1. A trailer configured to support and carry a load while being towed, the trailer comprising:
   a frame;
   a processor;
   a non-transitory memory device coupled to the processor;
   a plurality of load cells supporting a load on the trailer, each load cell being operatively coupled to the frame and electrically coupled to the processor, each load cell providing a corresponding signal to the processor, responsive to the load on the corresponding load cell and corresponding load location information to the processor from which the processor determines the weight and location of the load on the trailer, a determined location of the load on the trailer including a front-to-back location and a side-to-side location;
   a communications device operatively coupled to the processor, and configured to send to a tow vehicle, data representing information about the load on the trailer, the information about the load on the trailer being obtained from said plurality of load cells and being provided to the tow vehicle by the communications device in order to provide operating specifications of the trailer and provide characteristics of the load on the trailer to an engine control unit for the tow vehicle;
   wherein the communications device is additionally configured to send to the tow vehicle, operating requirements of the tow vehicle that are required by the trailer; and
   wherein the information about the load on the trailer is configured to be used by the tow vehicle to automatically inhibit operation of the tow vehicle if the tow vehicle has insufficient towing capacity to safely pull the trailer and its load.

2. The trailer of claim 1, wherein the memory device includes information about at least one of:
   operating specifications of the trailer; and
   requirements of a tow vehicle to be used with the trailer.

3. The trailer of claim 1, further comprising a sensor coupled to the processor and which is configured to detect an object adjacent to the trailer.

4. A tow vehicle configured to tow a trailer carrying a load, the tow vehicle having an engine and transmission and comprising:
   an engine control unit, the engine control unit being configured to control operation of at least the tow vehicle engine and tow vehicle transmission;
   a processor coupled to the engine control unit;
   a non-transitory memory device coupled to the processor and storing program instructions for the processor;
   a first communications device operatively coupled to the processor and configured to receive from a trailer physically attached to the vehicle, a signal carrying information about a load on an attached trailer, the information about a load on the attached trailer being generated by a plurality of load cells, which support the load on the trailer and provide load information that identifies the weight and location of the load on the trailer, the location of the load on the trailer including a front-to-back location and a side-to-side location, said load information being provided to said processor by the first communications device and being provided by said processor to the engine control unit, said load information causing the engine control unit to change an operation of the tow vehicle in order to safely tow the trailer with the load; and
   wherein the tow vehicle is configured to automatically inhibit operation of the tow vehicle upon determining that the tow vehicle has insufficient towing capacity based on the information about the load on the attached trailer received by the first communications device.

5. A tow vehicle configured to tow a trailer carrying a load, the tow vehicle having an engine and transmission and comprising:
   an engine control unit, the engine control unit being configured to control operation of at least the tow vehicle engine and tow vehicle transmission;
   a processor coupled to the engine control unit;
   a non-transitory memory device coupled to the processor and storing program instructions for the processor;
   a first communications device operatively coupled to the processor and configured to receive from a trailer physically attached to the vehicle, a signal carrying information about a load on an attached trailer, the information about a load on the attached trailer being generated by a plurality of load cells, which support the load on the trailer and provide load information that identifies the weight and location of the load on the trailer, the location of the load on the trailer including a front-to-back location and a side-to-side location, said load information being provided to said processor by the first communications device and being provided by said processor to the engine control unit, said load information causing the engine control unit to change an operation of the tow vehicle in order to safely tow the trailer with the load, wherein the tow vehicle is configured to automatically shift the transmission responsive to the receipt of the information about the load on the attached trailer by said first communications device.

6. The vehicle of claim 4, wherein said tow vehicle is configured to disable vehicle stability control responsive to the receipt of the information about the load on the attached trailer by said first communications device.

7. The vehicle of claim 4, further comprising a wire area network (WAN) communication device operatively coupled to the processor, the WAN communications device being configured to receive from a data network, data related to at least one of:
   the trailer; and
   the vehicle.

8. A method comprising:
   wirelessly receiving at a tow vehicle, a signal carrying operating information regarding a trailer to be towed by the tow vehicle, the trailer being configured to carry a load, the operating information being generated by at least a plurality of load cells coupled to the trailer, the operating information comprising:
   a weight of the load on the trailer;
   a front-to-back location of the load on the trailer and a side-to-side location of the load on the trailer; and
   an inclination of the trailer responsive to the load on the trailer;
   and
   changing the operation of the tow vehicle responsive to the tow vehicle's receipt of the operating information, wherein changing the operation of the tow vehicle comprises automatically inhibiting operation of the tow vehicle upon determining that the tow vehicle has insufficient towing capacity based on the wirelessly received signal carrying the operating information regarding the trailer.

9. The method of claim 8, wherein, the tow vehicle has a transmission and wherein changing an operation of the tow vehicle responsive to the received operating parameter is at least one of:
   downshifting the transmission; and
   disabling vehicle stability control.

* * * * *